(12) United States Patent
Coleman et al.

(10) Patent No.: US 10,372,092 B2
(45) Date of Patent: Aug. 6, 2019

(54) SYSTEM AND METHOD FOR CONTROLLING HVAC EQUIPMENT SO AS TO OBTAIN A DESIRED RANGE OF A SOUND PRESSURE LEVEL AND/OR SOUND POWER LEVEL

(71) Applicant: TRANE INTERNATIONAL INC., Piscataway, NJ (US)

(72) Inventors: Robert Lee Coleman, Lexington, KY (US); David Edward Edmonds, Stoddard, WI (US); Stephen John Lind, Onalaska, WI (US); Dustin Eric Jason Meredith, Lexington, KY (US)

(73) Assignee: TRANE INTERNATIONAL INC., Davidson, NC (US)

( * ) Notice: Subject to any disclaimer, the term of this patent is extended or adjusted under 35 U.S.C. 154(b) by 409 days.

(21) Appl. No.: 14/693,501

(22) Filed: Apr. 22, 2015

(65) Prior Publication Data
US 2015/0300671 A1    Oct. 22, 2015

Related U.S. Application Data

(60) Provisional application No. 61/982,607, filed on Apr. 22, 2014.

(51) Int. Cl.
*G05B 15/02* (2006.01)
*F24F 13/24* (2006.01)
(Continued)

(52) U.S. Cl.
CPC .............. *G05B 15/02* (2013.01); *F24F 13/24* (2013.01); *F24F 2120/20* (2018.01);
(Continued)

(58) Field of Classification Search
CPC .. F24F 11/006; F24F 13/24; F24F 2011/0057; F24F 2120/20; G05B 15/02;
(Continued)

(56) References Cited

U.S. PATENT DOCUMENTS 3,945,432 A * 3/1976 Tamblyn .................. F24F 3/00
165/210
5,010,739 A * 4/1991 Isshiki ................. F04D 27/004
181/175
(Continued)

FOREIGN PATENT DOCUMENTS

| JP | 09-089347 | 4/1997 |
| JP | 11-201608 | 7/1999 |

OTHER PUBLICATIONS

Office Action, U.S. Appl. No. 14/693,487, dated Nov. 9, 2016, (18 pages)
(Continued)

*Primary Examiner* — Brian W Wathen
*Assistant Examiner* — Mohammed Shafayet
(74) *Attorney, Agent, or Firm* — Hamre, Schumann, Mueller & Larson, P.C.

(57) ABSTRACT

A system and method for controlling the operation of heating, ventilating, and air conditioning (HVAC) equipment so as to achieve a desired range of a sound pressure level and/or a sound power level is described. The system and method can lead to a desired range of a sound pressure level and/or a sound power level for a zone using equipment that is typically included in HVAC systems. Such control of equipment can be important for privacy and comfort requirements.

13 Claims, 10 Drawing Sheets

(51) Int. Cl.
*F25B 49/02* (2006.01)
*F24F 120/20* (2018.01)

(52) U.S. Cl.
CPC ........... *F25B 49/02* (2013.01); *F25B 2500/12* (2013.01); *F25B 2700/172* (2013.01); *F25B 2700/173* (2013.01)

(58) Field of Classification Search
CPC ............ F25B 2700/173; F25B 2500/12; F25B 49/02; F25B 2700/172
USPC ................................................. 700/276, 280
See application file for complete search history.

(56) References Cited

U.S. PATENT DOCUMENTS

| | | | | |
|---|---|---|---|---|
| 5,203,178 | A * | 4/1993 | Shyu | F04C 28/28 417/14 |
| 5,261,252 | A * | 11/1993 | Peruch | B04B 15/02 494/14 |
| 5,341,650 | A | 8/1994 | Nagasawa et al. | |
| 5,457,750 | A * | 10/1995 | Ahn | F24F 1/00 381/71.3 |
| 5,522,768 | A | 6/1996 | Brodt et al. | |
| 5,636,287 | A | 6/1997 | Kubli et al. | |
| 5,777,897 | A * | 7/1998 | Giorgio | F24F 11/0079 700/299 |
| 5,907,955 | A * | 6/1999 | Park | F25D 21/006 62/131 |
| 5,950,439 | A | 9/1999 | Peterson et al. | |
| 6,049,615 | A * | 4/2000 | Chou | F24F 13/24 381/336 |
| 6,194,858 | B1 * | 2/2001 | Chen | H05K 7/20209 318/445 |
| 6,257,007 | B1 * | 7/2001 | Hartman | F25B 49/027 62/183 |
| 6,290,140 | B1 | 9/2001 | Pesko et al. | |
| 6,381,406 | B1 * | 4/2002 | Smith | H02P 6/08 318/721 |
| 6,536,675 | B1 * | 3/2003 | Pesko | F24F 13/24 165/238 |
| 6,625,285 | B1 | 9/2003 | Ohashi | |
| 6,928,826 | B2 * | 8/2005 | Lee | F24F 13/24 62/158 |
| 6,931,873 | B2 | 8/2005 | Oomura et al. | |
| 7,456,597 | B2 * | 11/2008 | Kanamori | H02P 6/08 318/599 |
| 7,517,185 | B2 | 4/2009 | Hirakawa et al. | |
| 7,640,761 | B2 | 1/2010 | Garrett et al. | |
| 7,743,617 | B2 * | 6/2010 | Crane | F25B 49/02 62/163 |
| 7,845,182 | B2 | 12/2010 | Yelles | |
| 7,900,462 | B2 * | 3/2011 | Hegar | B60H 1/00371 236/51 |
| 8,195,313 | B1 * | 6/2012 | Fadell | F24F 11/0009 236/1 C |
| 8,813,511 | B2 * | 8/2014 | Kopko | F25B 49/027 62/181 |
| 9,299,332 | B2 | 3/2016 | Je | |
| 9,422,861 | B2 * | 8/2016 | Miyagawa | F02B 77/11 |
| 2003/0053004 | A1 * | 3/2003 | Yoon | H04N 9/3141 348/748 |
| 2004/0176877 | A1 * | 9/2004 | Hesse | G05B 15/02 700/276 |
| 2004/0264125 | A1 * | 12/2004 | Cheng | G06F 1/206 361/679.48 |
| 2005/0030171 | A1 | 2/2005 | Liu et al. | |
| 2005/0047762 | A1 * | 3/2005 | Liu | H05K 7/20209 388/806 |
| 2005/0056481 | A1 | 3/2005 | Mafi et al. | |
| 2005/0125102 | A1 * | 6/2005 | Nichols | F24F 11/0086 700/276 |
| 2005/0223725 | A1 * | 10/2005 | Crane | F25B 49/02 62/183 |
| 2006/0179859 | A1 | 8/2006 | Nakata et al. | |
| 2006/0192021 | A1 * | 8/2006 | Schultz | G05D 23/1904 236/1 C |
| 2007/0079313 | A1 | 4/2007 | Sakurai | |
| 2008/0245504 | A1 * | 10/2008 | Eisenhour | B60H 1/00849 165/43 |
| 2008/0311840 | A1 | 12/2008 | Rainey et al. | |
| 2009/0034746 | A1 | 2/2009 | Nozaki et al. | |
| 2009/0037152 | A1 | 2/2009 | Holahan et al. | |
| 2010/0094466 | A1 * | 4/2010 | Judge | F25B 49/02 700/275 |
| 2010/0247339 | A1 | 9/2010 | Lagemann | |
| 2011/0010015 | A1 * | 1/2011 | Jordan | B60H 1/00735 700/280 |
| 2011/0061967 | A1 | 3/2011 | Penner et al. | |
| 2011/0308883 | A1 * | 12/2011 | Eaton | F24F 7/065 181/224 |
| 2012/0171947 | A1 * | 7/2012 | Takeda | F24F 1/0007 454/251 |
| 2013/0008633 | A1 | 1/2013 | Gradinger et al. | |
| 2013/0131886 | A1 * | 5/2013 | Nitta | G06F 1/206 700/300 |
| 2013/0201316 | A1 * | 8/2013 | Binder | H04L 67/12 348/77 |
| 2014/0094973 | A1 * | 4/2014 | Giaimo, III | G01H 3/10 700/280 |
| 2014/0309789 | A1 * | 10/2014 | Ricci | B60Q 1/00 700/276 |
| 2014/0316581 | A1 * | 10/2014 | Fadell | F24F 11/0009 700/276 |
| 2014/0360805 | A1 * | 12/2014 | Berkman | H04R 1/02 181/141 |
| 2015/0036832 | A1 * | 2/2015 | Usher | H04R 3/005 381/56 |
| 2015/0224848 | A1 * | 8/2015 | Eisenhour | B60H 1/0075 62/186 |
| 2015/0282440 | A1 * | 10/2015 | Shelor | A01G 9/18 47/17 |
| 2016/0195297 | A1 * | 7/2016 | Fan | F24F 11/0078 165/217 |

OTHER PUBLICATIONS

Final Office Action, U.S. Appl No. 14/693,487, dated Apr. 3, 2017 (15 pages)

* cited by examiner

SYSTEM AND METHOD FOR CONTROLLING HVAC EQUIPMENT SO AS TO OBTAIN A DESIRED RANGE OF A SOUND PRESSURE LEVEL AND/OR SOUND POWER LEVEL

FIELD

The embodiments disclosed herein relate generally to systems and methods for controlling one or more components in a heating, ventilating, and air conditioning (HVAC) system so as to obtain a desired range of a sound pressure level and/or a sound power level.

BACKGROUND

Controlling the operation of heating, ventilating, and air conditioning (HVAC) equipment so as to achieve a certain temperature and/or humidity of a conditioned space is known. Such control can be important for comfort requirements. Improvements in the control of HVAC equipment in a conditioned space are desirable.

SUMMARY

The embodiments described herein are directed to a system and method for controlling an operation of at least one component in a heating, ventilating, and air conditioning (HVAC) system so as to obtain a desired range of a sound pressure level and/or a sound power level.

The terms "sound pressure level" and "sound power level" are described as follows. A sound pressure level and a sound power level are two different quantities. They are related, but are not interchangeable.

A sound power level can be expressed in terms of decibels (dBs) relative to a reference sound power:

$$L_w = 10\ \log_{10}\!\left(\frac{\text{sound power, } W}{10^{-12} W}\right)$$

where "$L_w$" is the sound power level, and "sound power, W" and "$10^{-12}$ W" are the sound powers. Note that the "sound power level" and "sound power" are different. The former is a quantity expressed in terms of dBs, while the latter is a quantity expressed in terms of watts.

A sound pressure level also can be expressed in terms of dBs relative to a reference sound pressure:

$$L_P = 20\ \log_{10}\!\left(\frac{\text{sound pressure, } \mu\text{Pa}}{20\ \mu\text{Pa}}\right)$$

where "$L_p$" is the sound pressure level, and "sound pressure, µPa" and "20 µPa" are the sound pressures. Note that the "sound pressure level" and "sound pressure" are different. The former is a quantity expressed in terms of dBs, while the latter is a quantity expressed in terms of Pascals.

A common analogy to explain the difference is based on a light bulb. The sound power level can be considered as corresponding to the number of watts for the bulb while the sound pressure level can be considered as corresponding to the perceived brightness at the observer's position. As to the wattage, a bulb, for instance a 100 W bulb, has the same watts (100 W for the 100 W bulb) no matter where it is used or where it is measured. That is, the wattage is an inherent property of the bulb. On the other hand, the brightness perceived by the user depends on environmental factors, such as the configuration of the room in which the bulb is placed and/or on the location of the bulb and observer. For example, a bulb appears brighter if the walls are white or have mirrors, if the room is smaller, or if the observer is very close to the bulb. The perceived brightness is a function of both the watts and the path between the bulb and the observer.

Similarly, a sound power level is an inherent property of the equipment. For example, a fan that produces 90 dBs of a sound power level will produce this regardless of where it is located or measured. The sound pressure level for the fan depends on where the listener is located relative to the machine. For instance, if the fan is located in a mechanical room with concrete walls and the person listening to the fan is one meter away, it will be much louder than if the fan is located outside far from any walls and the listener is ten meters away.

In some examples, an operation of HVAC equipment is controlled so as to obtain a desired range of a sound pressure level in a zone. The term "zone" herein means a single space or a group of spaces.

Advantageously, the systems and methods described herein can lead to the desired range of a sound pressure level in a zone by controlling one or more components that is typically included in HVAC systems including, but not limited to, a supply fan, cooling coil, a damper, etc. Such control of equipment can be useful, e.g., in setting a desired sound pressure level to be within a certain range, e.g., during a certain time period and for a given zone.

One example where the disclosed system and method can be implemented is a classroom setting. That is, during a time period where classes are taking place and low sound pressure levels within the classroom are desirable, the equipment can be controlled so as to obtain the desired range of a sound pressure level.

In some examples, systems and methods described herein can schedule the controlling of the operation of the equipment so that the desired range of a sound power level and/or a sound pressure level is obtained during a certain time period. In the classroom example, the controlling of the operation of the equipment can be scheduled so that a relative low range of a sound pressure level is obtained during class time, and relatively higher range of a sound pressure level is allowed during recess or other times in which the classroom may be empty.

In some embodiments, described systems and methods can involve controlling the operation of one or more components in an HVAC system using an open loop or closed loop control, to obtain a desired range of sound pressure level.

"Open loop control" means that the desired range of sound pressure levels is obtained by directly controlling the operation of one or more components in an HVAC system. The term "closed loop control" means that the desired range of sound pressure levels is obtained in response to a feedback mechanism.

One example of an "open loop control" is where a user adjusts the operational setting or operational mode of the HVAC equipment so as to obtain a desired range of sound pressure level. This can be achieved by selecting a range of sound power levels produced by the equipment appropriate to result in the desired sound pressure level in the affected zone.

In some examples, the desired range of a sound pressure level is based on a sound pressure map. The sound pressure map corresponds to a related sound power map. A sound power map and/or the sound pressure map is a lookup graph/table associating a range of sound power levels and/or the corresponding sound pressure levels with a certain operational mode or operational setting. In some instances, such relationships between sound power levels and sound pressure levels can be measured, calculated, or assumed.

One example of a "closed loop control" is where feedback is obtained, and based on the feedback, the operational setting or operational mode of the HVAC is adjusted so as to obtain a desired range of sound pressure level in an affected zone.

In some examples, the feedback can be obtained from a device. The device can be, for example, a device that is capable of detecting a signal, e.g., a sound pressure within the zone, sound intensity flowing to the zone, or a sound pressure at a point in the path between the source and the zone.

Going back to the classroom example, if the students are in recess, it may be acceptable to generate higher levels of noise from the HVAC equipment resulting in higher sound pressure levels in the classroom. The HVAC equipment could then be operated at or near maximum capacity because the sound pressure in the room is not critical at this time. When the desired sound pressure is relatively low, the operational setting or operational mode of the HVAC equipment can be adjusted so that the HVAC equipment operates at in a mode producing a lower range of a sound power level and/or the resulting lower range of sound pressure level in the classroom.

In some other examples, one or more HVAC equipment can be controlled to achieve one or more desired space conditions of the zone in addition to obtaining the desired range of a sound power level and/or a sound pressure level. The term "space condition" means the environmental status of the zone, for example, temperature, humidity, airflow, etc.

In some instances, the operation of a supply fan in the HVAC system can be controlled by increasing or decreasing the speed of the supply fan to obtain a sound power level resulting in a desired sound pressure level. In another instance, the temperature of the cooling coil can be controlled to allow the fan speed to operate to obtain the desired range of a sound level. In this instance, the operation of the cooling coil can be controlled by increasing or decreasing the temperature of the coil. For example, the temperature of the cooling coil can be decreased and the speed of the supply fan can be decreased such that the sound power level of the equipment and the corresponding sound pressure level in the zone is relatively low, but the temperature of the zone is to be maintained.

Other aspects will become apparent by consideration of the detailed description and accompanying drawings.

BRIEF DESCRIPTION OF THE DRAWINGS

Reference is now made to the drawings in which like reference numbers represent corresponding parts throughout.

DETAILED DESCRIPTION

The embodiments described herein are directed to systems and methods for controlling an operation of at least one component in a heating, ventilating, and air conditioning (HVAC) system so as to obtain a desired range of a sound pressure level such as for example as defined in ANSI/ASA S1.1-2013 Acoustical Terminology.

Figure 1:
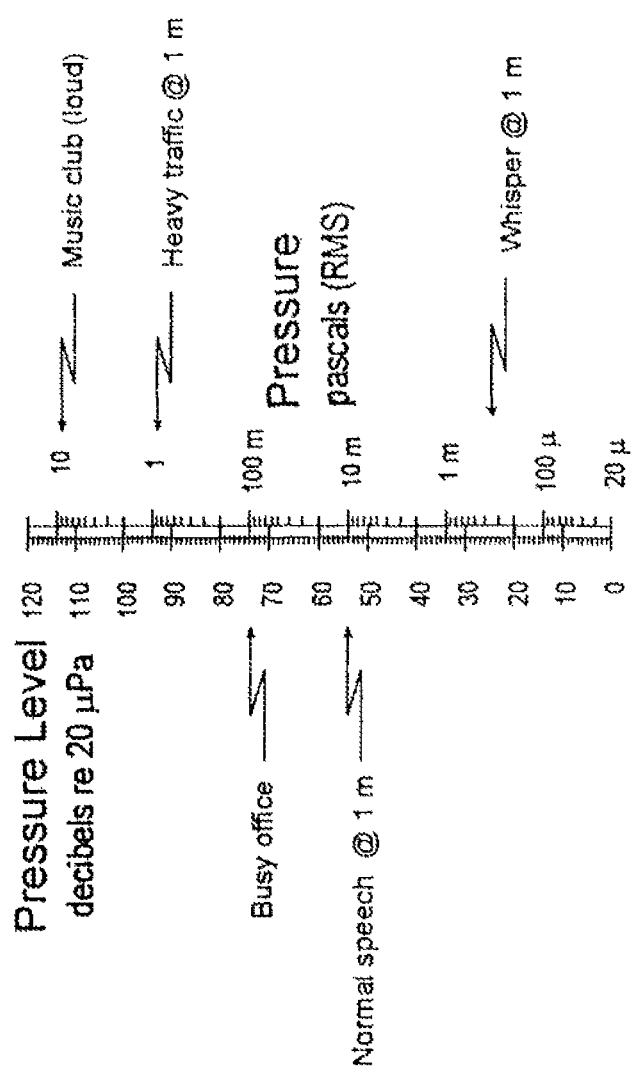
FIG. 1 shows one example of a sound pressure level graphic.

In some examples, the desired range of a sound level varies for the same environment at different times, e.g. a classroom setting during recess. FIG. 1 is a graphic that shows a range of sound pressure levels for a few common sounds for reference.

In some examples, the range of a sound level is based on a sound map. The term "sound pressure map" and "sound power map" are described as follows.

Figure 2:
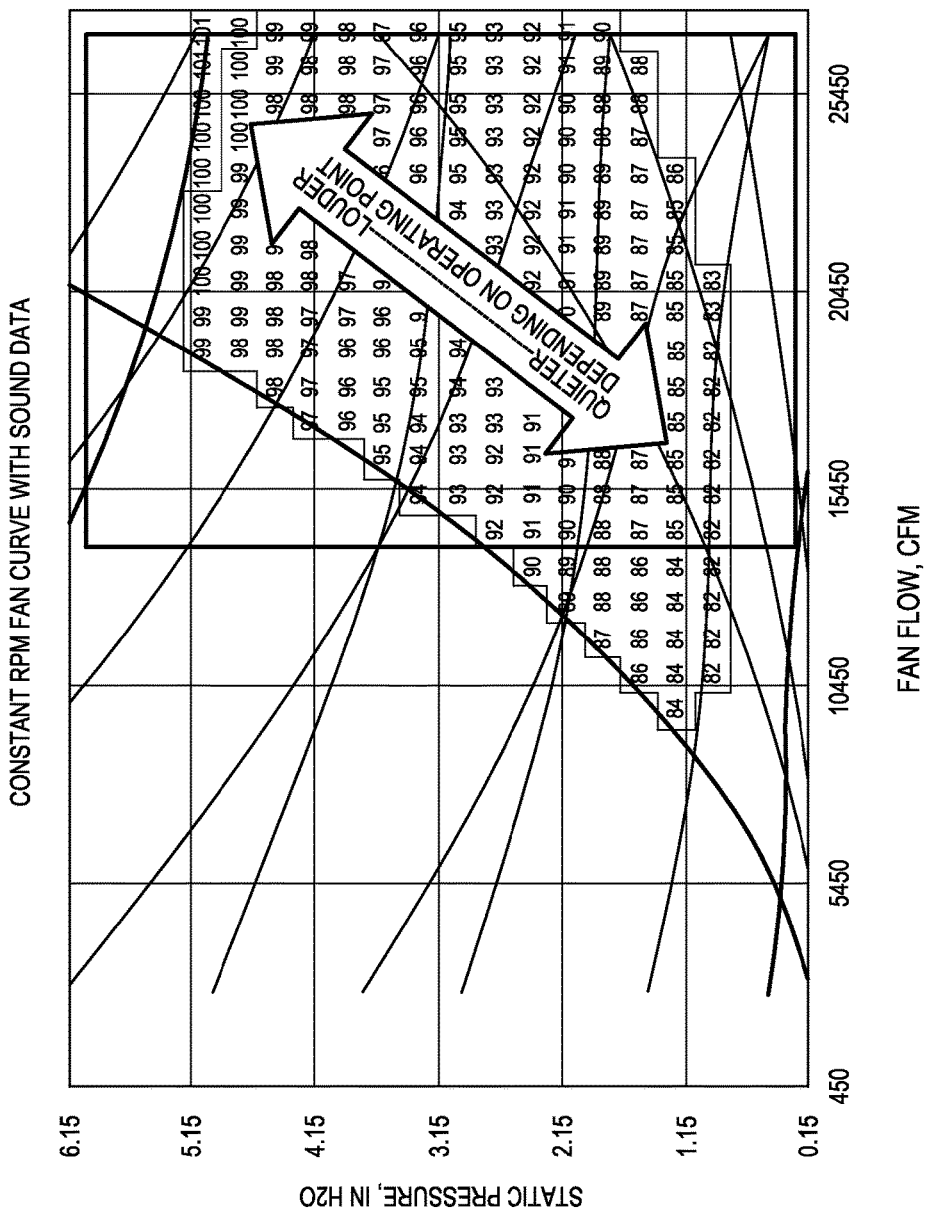
FIG. 2 shows one example of a sound power map.

In general, HVAC equipment generates a certain amount of noise when operated at a certain operational mode or operational setting as shown in FIG. 2. For instance, a supply fan typically generates a relatively higher amount of sound when operated at a higher level of speed, and relatively lower amount of sound when operated at a lower level of speed. In some examples, a map can be used to describe the sound level to the corresponding operational setting or operational mode of certain HVAC equipment, for example, a supply fan.

The noise generated by the HVAC equipment is modified as it travels to a space where sound is important. The sound energy transferred to the space will be affected by building attributes for example distance, duct size, duct type, wall construction, etc. The resulting sound pressure in the room can be mapped according to the HVAC operation.

FIG. 2 shows one example of a sound power map of a supply fan. In particular, FIG. 2 shows a graph of the static pressure relative to the fan flow of the supply fan, where the ranges of sound power levels are associated with certain areas of the graph based on the relation between the static pressure, the fan flow, and the fan speed. Note that the associations of the sound power levels can be based on empirical data and/or calculations.

In FIG. 2, the upper range is between 100 and 105 dB, the middle range is between 95 and 100 dB, and the lower range is between 90 and 95 dB. As the speed of the supply fan increases, the sound power levels increase toward the upper range, while as the speed of the supply fan decreases, the sound power levels decrease toward the lower range.

Figure 3:
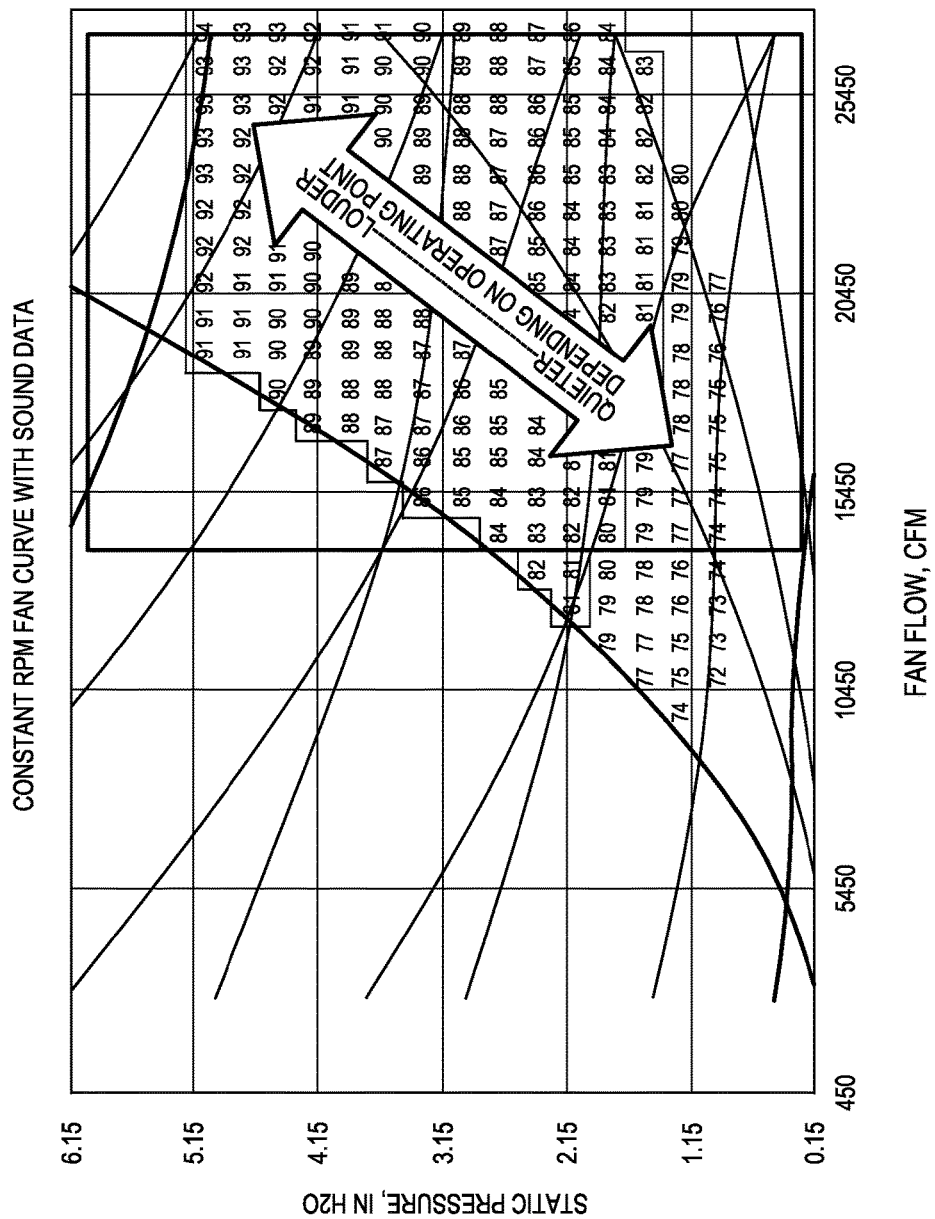
FIG. 3 shows on example of a sound pressure map.

FIG. 3 shows one example of a sound pressure map. The sound pressure map is developed from the sound power map as modified by a building transfer function.

Note that FIGS. 1-3 are provided for exemplary purposes only, and it is to be realized that the concepts described herein can apply to other sound pressure maps and sound power maps that may be generated with other HVAC equipment in other environments.

Figure 4A:
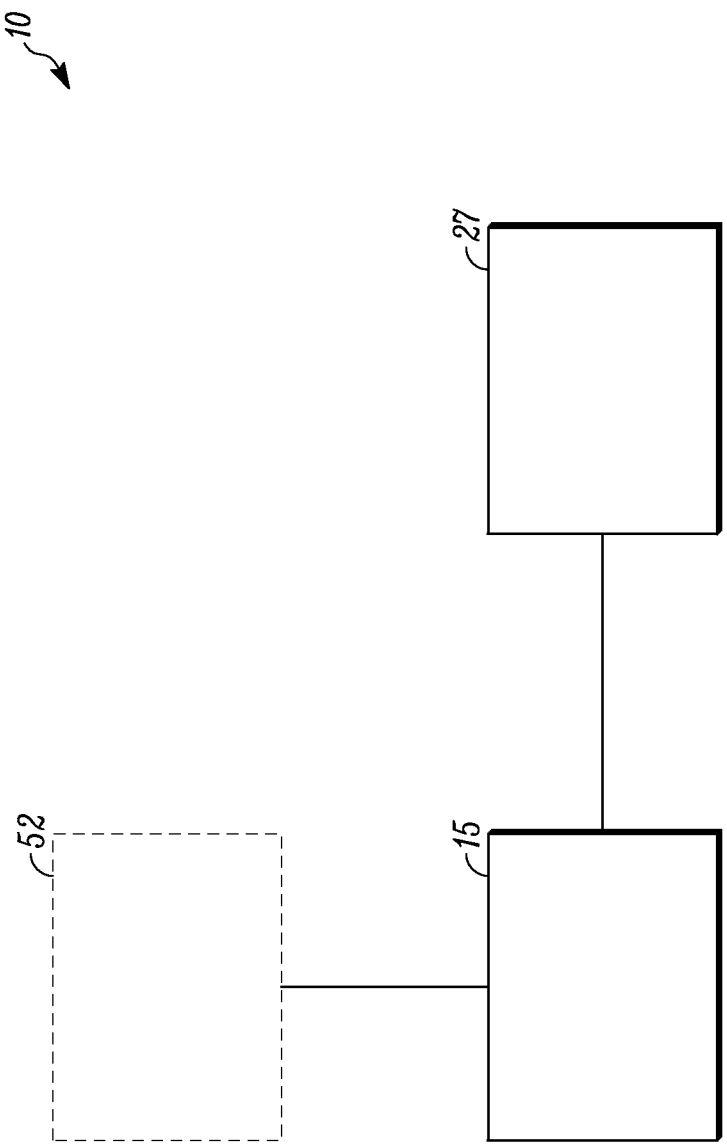
FIG. 4A is a schematic illustration of a system for controlling an operation of HVAC equipment so as to obtain a desired sound power level and/or sound pressure level, according to one embodiment.

One embodiment of a disclosed system is illustrated in FIG. 4A (see system 10). The system 10 includes a controller 15 and HVAC equipment 27. The controller 15 controls the HVAC equipment 27. The HVAC equipment 27 that is controlled can be any equipment that is suitable for achieving a desired range of a sound level by controlling the operation of the equipment.

In some examples, the operation of the HVAC equipment 27 is controlled, e.g., using an open or closed loop controller 15, to obtain a desired range of a sound level. The HVAC equipment 27 that is controlled can be any existing equipment in the HVAC system that is suitable for controlling its operation to obtain a desired range of a sound level. The HVAC equipment 27 that can be controlled includes, but is not limited to, a supply fan, a damper, cooling coils, etc. It is to be realized that any number and combination of HVAC equipment 27 that is suitable for controlling their operation to obtain the desired range of a sound level can be used. For example, both the supply fan and the damper can be controlled to obtain the desired range of a sound level.

In the instance where the supply fan is controlled, the supply fan can be controlled by decreasing the fan speed when the desired range of a sound level is low, and increasing the fan speed when the desired range of a sound level is high. In another example where the damper is controlled, the damper can be controlled by bypassing air to a silencer when the desired range of a sound level is low. In this instance, the priority would be switched from energy efficiency to sound, since bypassing the air to the silencer and any associated bypass duct can in some cases increase power consumption. In yet another example, the damper can be controlled by allowing the air to expand in a plenum when the desired range of a sound level is low. In this instance, the plenums would generally have a relatively high pressure loss through expansions and contractions of the plenums.

In some examples, the HVAC equipment 27 can be controlled to obtain a desired space condition in addition to the desired range of a sound level. The additional desired space condition can be any desired space condition that can be obtained by the operation of the HVAC equipment 27 including, but not limited to, a desired temperature, a desired humidity, a desired air flow, etc.

For example, where a certain temperature is desired in addition to a desired range of a sound level, both the cooling coil and the supply fan can be controlled. For example, if a current temperature of a room is to be maintained, but a desired range of a sound level is to be relatively lower, then the temperature of the cooling coil can be decreased and the speed of the supply fan can be decreased so that the range of sound power levels and/or sound pressure levels is as desired, and the temperature of the zone is maintained.

In some examples, a controller can compute its input into a system using the current state of the system. For instance, a user can manually set a desired range of a sound level using the controller 15. Based on this range, the controller 15 would then send command signals to certain HVAC equipment 27, for example, the supply fan, to operate in a certain state based on the set desired range of a sound level.

In some examples, the control of the HVAC equipment is based on a sound power map or sound pressure map, e.g., as shown in FIGS. 1-3.

In some examples, the controller 15 can utilize feedback from a feedback component 52. In some examples, the feedback component 52 can be a device. In other examples, the feedback component 52 can be a user.

In one example, the controller controls the HVAC equipment 27 using the device 52. In some examples, the device 52 that is used is a device that is capable of emitting, detecting, and/or measuring a signal. The signal can be any signal that can be emitted, detected and/or measured, including, but not limited to, sound level, vibration level, heat, carbon dioxide level, etc. The device 52 can be, but is not limited to, a microphone, amplifier, thermometer, accelerometer, etc. In some examples, one or more devices can be used.

Examples of different implementations will now be described.

In one implementation, the operation of the HVAC equipment can be controlled via a schedule. In one example, the schedule can be a classroom schedule that includes "class time" and "break time." During "break time", the limit of the desired range of a sound level could be set for example at a relatively high level, and the HVAC equipment can be ramped up to condition the space, for example, to relatively a far threshold of a comfort criteria defined by an industry standard, for example, in the American Society of Heating, Refrigerating and Air Conditioning Engineers (ASHRAE) handbook. During "class time", the limit of the desired range of a sound level could be set for example at a relatively low level, and the controller would allow the space conditions to "drift" within a certain range of the comfort-criteria, while operating certain HVAC equipment, e.g., the supply fan, in a certain state, e.g., reduced speed, so as to achieve a desired sound level.

In yet another embodiment, the equipment could be controlled to maintain a minimum sound level instead of a maximum. The most applicable scenario for such a strategy would be to address privacy concerns. For example, if the time-averaged sound level in the space fell below set criteria, the equipment could be operated to ensure the minimum was met. By closing the cooling coil valve, the fan would have to run at a higher speed to maintain other space parameters like temperature and/or humidity.

In some instances, controlling via the schedule can be determined by a sound map as described above. In some other instances, controlling via the schedule can be determined by a signal measured by a device, e.g., a microphone.

In another implementation, the operation of the HVAC equipment can be controlled based on priority. In one instance, the priority can be an order of importance of certain conditions. The conditions can be, but are not limited to, sound and efficiency. In some examples, priority can be sound over efficiency. In this instance, the system can be controlled for example to bypass air to a silencer and any associated bypass duct, which would decrease energy efficiency, but allow a lower range of sound power levels and resulting sound pressure levels to be achieved as discussed above. Where the priority is switched to efficiency over sound, the system can be controlled for example to send air straight through the duct so as to increase energy efficiency irrespective of the sound power levels and/or sound pressure levels. A practical example would be in a movie theater, where during screening, a low range of a sound level is desired, and when the theater is not projecting a movie, energy efficiency would be more important than the sound level.

In yet another implementation, the operation of the HVAC equipment can be controlled based on a signal to noise ratio. In this implementation, the operating states of the HVAC equipment follow the signal that is measured by a device. In one example, the device used is a device that is capable of emitting, detecting, and/or measuring a signal. In one instance, the background sound could be measured by, e.g., a microphone or amplifier. The system can be controlled so that as the background sound increases, certain HVAC equipment, e.g., the supply fan, would operate in an assumed associated state, e.g., increased speed, and when the background sound decreases, certain HVAC equipment, e.g., the supply fan, would operate in another assumed associated state, e.g., decreased speed. A practical example would be when watching a movie. During loud scenes, the equipment can over-condition the space, but during dialog-type scenes, the equipment would operate at a lower range of a sound level. In this instance, the device utilized could be an amplifier. In one instance, an amplifier and the soundtrack of the movie could be used to anticipate the times in which a lower range of a sound level is required.

One exemplary embodiment will now be discussed with reference to FIGS. 4B to 7B.

Figure 4B:
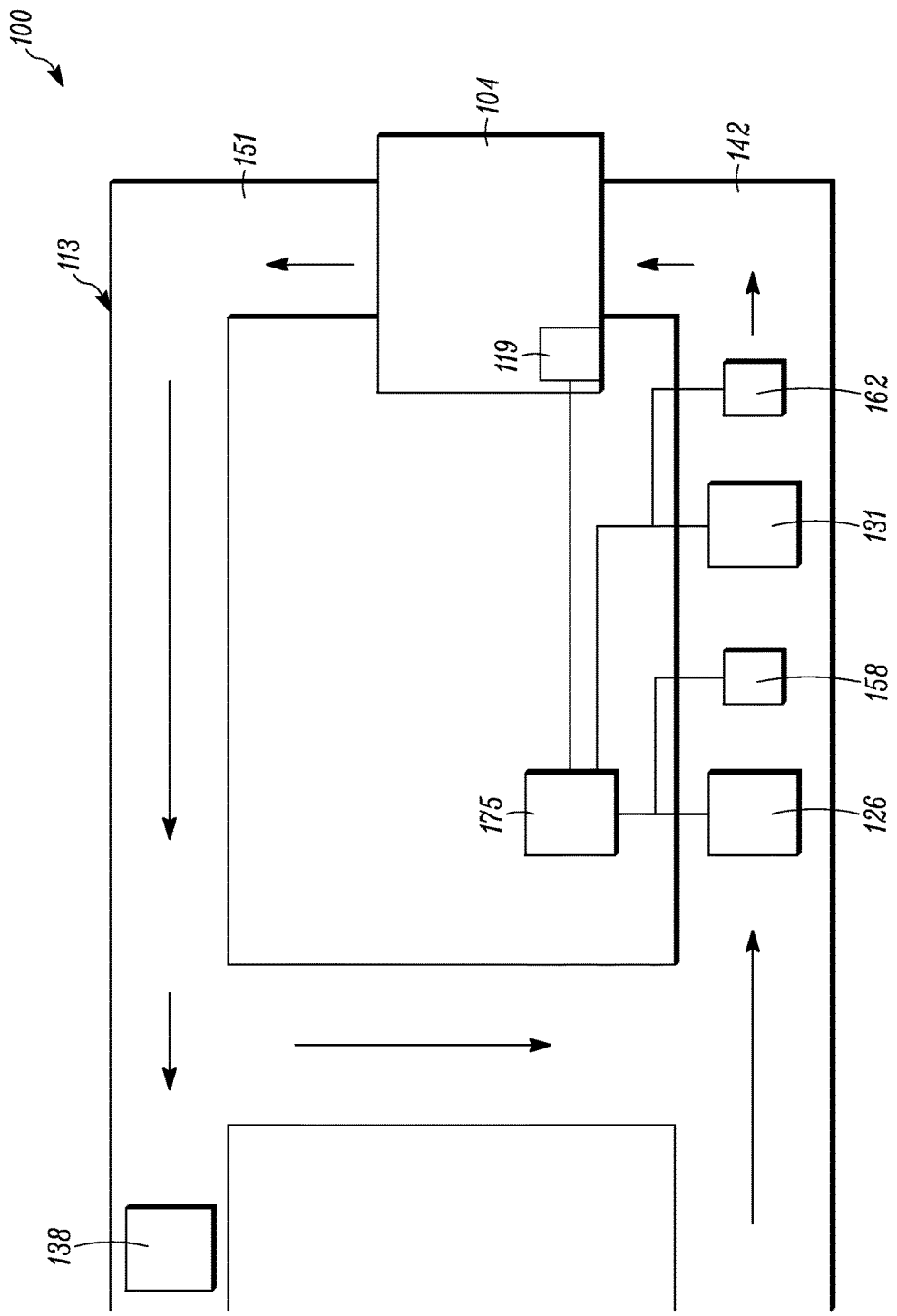
FIG. 4B is a schematic illustration of a system for obtaining a desired sound power level and/or sound pressure level, according to one embodiment.

FIG. 4B provides a schematic illustration of one example of a disclosed system (see system 100 in FIG. 4B). The system 100 includes a zone 104 and a ductwork 113 that is in fluid communication with the zone 104. The zone 104 can include a thermostat 119 that measures a dry-bulb temperature of the zone 104. The term "dry-bulb temperature" herein means a temperature of air measured by the thermostat 119 that is freely exposed to the air but shielded from radiation and moisture. The ductwork 113 can include components that are typically included in an HVAC system. The components included in the ductwork 113 are a cooling coil 126, a supply fan 131, a relief fan 138, a supply duct 142, and a return duct 151.

The ductwork 113 and the zone 104 can be configured so that needed airflow can flow from the ductwork 113 into the zone 104, back into the ductwork 113 and then out of the ductwork 113 as generally known in the art. The needed airflow can include supply air, return air, and exhaust air.

The general pathway of the airflow is indicated by the arrows in FIG. 4B. Generally, air flows past the cooling coil 126 so as to be cooled. The cooled air then is delivered by the supply fan 131 through the supply duct 142 into the zone 104 as supply air. The supply fan 131 also can be used to draw air out of the zone 104 through the return duct 151 as return air. Some outdoor air for ventilation can be mixed with the recirculated portion of the return air. The remaining return air, that which has been replaced by outdoor air, can be then exhausted as exhaust air by a relief fan 138.

In one embodiment, the system 100 can be a single-zone, variable-volume (VAV) system. The term "single-zone, VAV system" herein means a single zone system that delivers a variable quantity of constant-temperature air to one temperature-controlled zone. A zone may be either a single space or a group of spaces that react thermally in a similar manner over time and are governed by one thermostat. Thus, in some examples, in the system 100, the zone 104 can be a single space or a group of spaces that react thermally in a similar manner over time and are governed by the thermostat 119.

In some examples, the cooling coil 126 can be in fluid communication with a condenser (not shown) and a compressor (not shown). The cooling coil 126, the condenser and the compressor can utilize a refrigerant cooling circuit that is generally known in the art. In some instances of the refrigerant cooling circuit, the compressor can feed high-pressure and high-temperature refrigerant gas to a condenser. The refrigerant vapor that is delivered to the condenser then can enter into a heat exchange relationship with a fluid, for example, air. The condensed liquid refrigerant from the condenser then can flow through an expansion device to a heat exchanger that includes the cooling coil 126. The liquid refrigerant in the cooling coil 126 then can enter into a heat exchange relationship with a secondary fluid, e.g., air or water, that is introduced into the heat exchanger to chill the temperature of the secondary fluid. The refrigerant liquid in the heat exchanger (e.g., evaporator) then can undergo a phase change to a refrigerant vapor as a result of the heat exchange relationship with the secondary fluid. The refrigerant vapor then can return to the compressor to complete the refrigeration cycle.

The ductwork 113 can further include a thermostat 158. In this instance, the system 100 can be a single VAV system, where the thermostat 158 does not govern the temperature of the zone 104. In one example, the thermostat 158 can be an off coil thermostat. The thermostat 158 can measure an off coil temperature between the cooling coil 126 and the supply fan 131. The term "off coil temperature" herein means a dry-bulb temperature in the ductwork 113 between the cooling coil 126 and the supply fan 131 when the compressor is turned off.

FIG. 4B illustrates the thermostat 158 being positioned between the cooling coil 126 and the supply fan 131. However, it is to be realized that the thermostat 158 can be positioned anywhere in the system 100 suitable for measuring the dry-bulb temperature in the ductwork 113 between the cooling coil 126 and the supply fan 131.

The ductwork 113 can further include a feedback device 162. The feedback device 162 can detect a level of a signal. In some examples, the level of a signal can indicate a sound level such as for example a sound power and/or sound pressure. The feedback device 162 can be any device that is suitable for detecting a level of a signal, for example, the sound level. In some examples, the feedback device 162 is a microphone.

The system 100 further can include a controller 175. The controller 175 generally can include a processor, a memory, a clock, and an input/output (I/O) interface, and can be configured to receive data as input from various components within the system 100, and send command signals as output to various components within the system 100.

In some examples, during operation, the controller 175 can receive information, for instance, from the thermostat 119, the thermostat 158, and/or the feedback device 162 through the I/O interface, process the received information using the processor based on an algorithm stored in the memory, and then send command signals, for instance, to the components involved in the refrigerant cooling circuit including the condenser, the compressor, the cooling coil 126 and/or the supply fan 131. For example, the controller 175 can receive information regarding the dry-bulb temperature from the thermostat 119, process the temperature data, and then based on the data, send a command signal to the supply fan 131 so as to control the supply fan 131. In some examples, the supply fan 131 is controlled by turning the fan on or off. In some other examples, the supply fan 131 is controlled by increasing, decreasing or maintaining a speed of the supply fan 131. Details of the various algorithms that can be stored in the memory will now be provided below.

Generally, the controller 175 can be configured to implement disclosed methods of controlling an operation of HVAC equipment so as to obtain a desired sound level as illustrated in FIGS. 5-7B. In general, the processes described in FIGS. 5-7B are described in the context of using the system 100 of FIG. 4B and are executed by the processor executing program instructions (algorithms) stored in the memory of the controller 175. It will be appreciated that the methods of FIGS. 5-7B may be implemented in systems other than the system 100 which may be configured or arranged differently.

Figure 5:
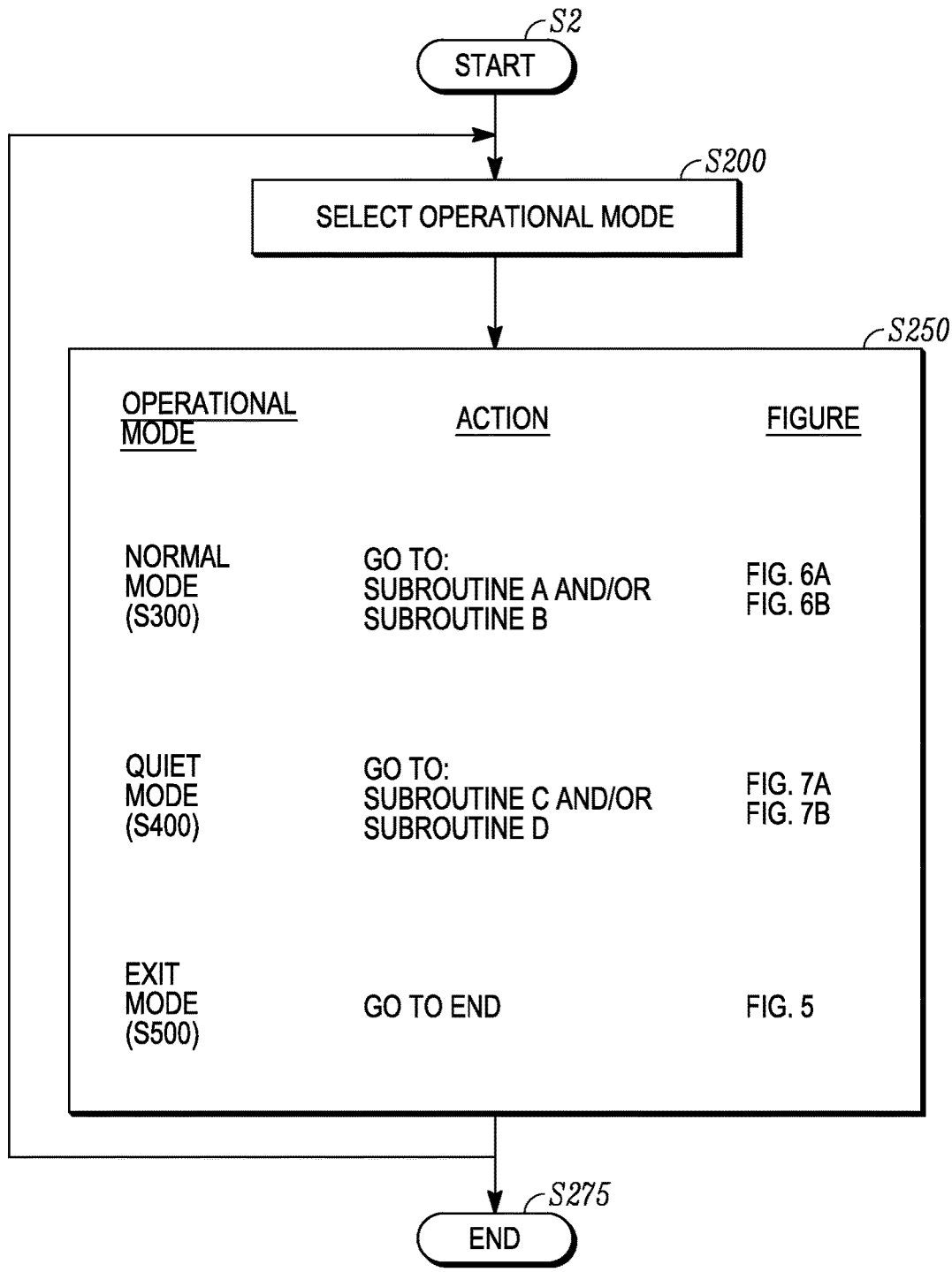
FIG. 5 is a flowchart of the overall processes involved when a user selects a certain operational mode so as to obtain a desired sound power level and/or sound pressure level, according to one embodiment.

With reference to FIG. 5, in one embodiment, the method 200 initiates at S2 and proceeds to S200 where a user can select from a plurality of operational modes and executing processes involved with the selected operational mode S250. The plurality of operational modes can include, for example, a normal mode S300, a quiet mode S400, and an exit mode S500. Once the operational mode is selected, corresponding subroutines A-D can be invoked.

In some examples, the operational mode can be selected directly by a user or based on a schedule that may be set by a user. Where the operational mode is selected based on a schedule set by the user, the user can, for example, program a predetermined time(s) or time period(s) in the controller 175 at which one or more of the operational modes is selected. For example, a user can program a time or time period when the quiet mode S400 is selected, for instance, during reading time for students, and a time or time period when the normal mode S300 is selected, for example, during recess when there is not a need to limit the noise in the system 100.

In some other examples, the operational mode can be selected based on a measured parameter. In one instance, the measured parameter can indicate occupancy of the zone 104. In this instance, the measured parameter can be an amount of $CO_2$, an infrared signal, or a motion signal. In some other instance, the measured parameter can be a signal that is emitted by the feedback device 162.

Figure 6A:
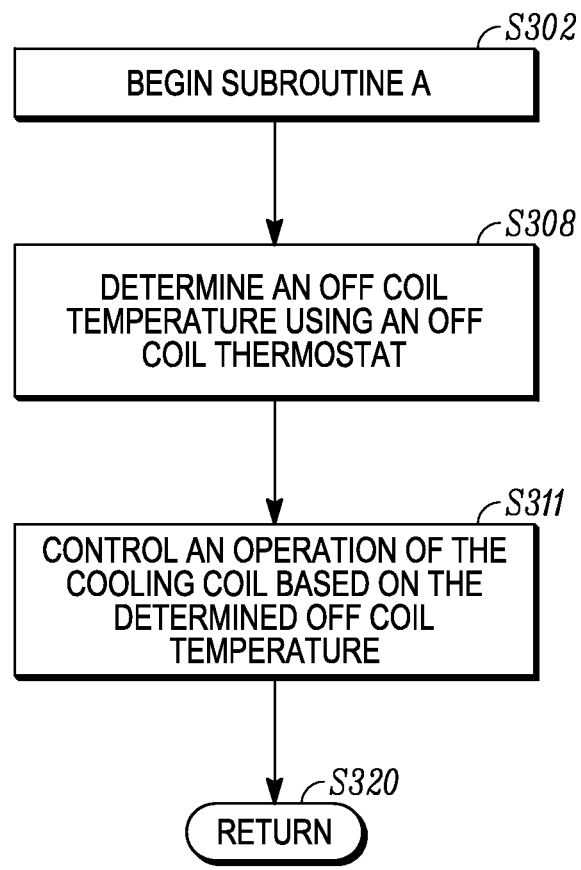
FIGS. 6A and 6B are flowcharts of the processes involved when a user selects the normal mode, according to one embodiment.
Figure 6B:
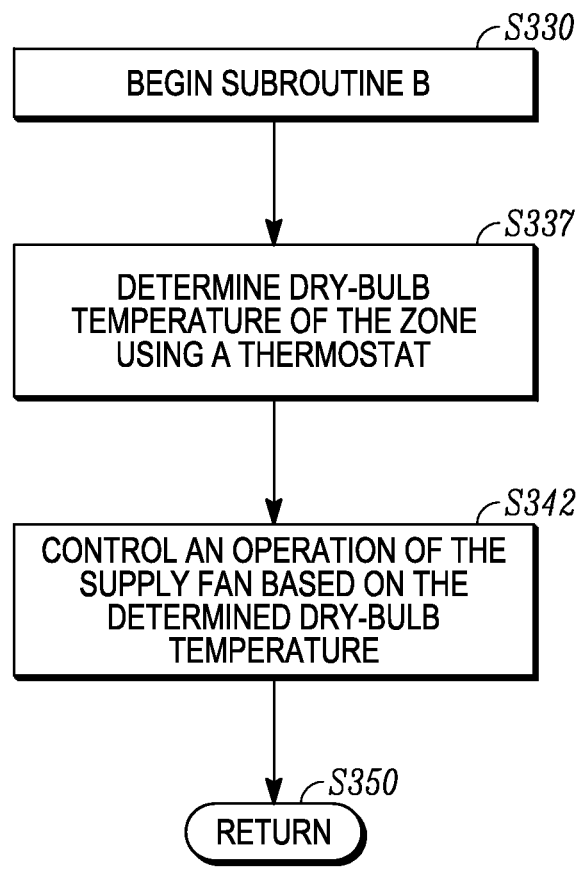

With reference to FIGS. 6A and 6B, if the normal mode S300 is selected, then subroutine A begins at S302 and/or subroutine B begins at S330.

Referring to FIG. 6A, subroutine A can include determining an off coil temperature using the thermostat 158 (S308), and then controlling the operation of the cooling coil 126 based on the determined off coil temperature (S311). The term "controlling the operation of the cooling coil 126" means increasing, decreasing or maintaining the amount of heat transfer capacity of the cooling coil 126. In some examples, the operation of the cooling coil 126 can be controlled in any suitable manner known in the art. For instance, the cooling coil 126 can be controlled by turning the condenser on or off based on the determined off coil temperature.

In some instances, the operation of the cooling coil 126 is controlled based on the determined off coil temperature for a predetermined amount of time. In some other instances, the operation of the cooling coil 126 is controlled based on the determined off coil temperature until a user selects a different operational mode, such as the quiet mode S400 or the exit mode S500.

In some examples, after S311, the subroutine A can return S320 to S250 in FIG. 5.

Referring to FIG. 6B, subroutine B can include determining a dry-bulb temperature of the zone 104 (S337), and then controlling the operation of the supply fan 131 based on the determined dry-bulb temperature (S342). The term "controlling the operation of the supply fan 131" means manipulating the speed of the fan so as to increase, decrease or maintain the quantity of supply air that is delivered to the zone 104. In some examples, the operation of the supply fan 131 can be controlled in any suitable manner known in the art. For instance, in the instance where the supply fan 131 is a variable speed fan, the supply fan 131 can be controlled by increasing, decreasing or maintaining a speed of the fan based on the determined dry-bulb temperature of the zone 104. In the instance where the supply fan 131 runs at a fixed speed, the supply fan 131 can be controlled by turning the fan on or off based on the determined dry-bulb temperature of the zone 104.

In some implementations, the speed of the supply fan 131 can be increased if the determined dry-bulb temperature is higher than a predetermined level, and can be decreased if the determined dry-bulb temperature is lower than the predetermined level. If the dry-bulb temperature is at the predetermined level, the speed of the supply fan 131 can be maintained.

In some examples, the operation of the supply fan 131 is controlled based on the determined dry-bulb temperature for a predetermined amount of time. In some other instances, the operation of the supply fan 131 is controlled based on the determined dry-bulb temperature until a user selects a different operational mode, such as the quiet mode S400 or the exit mode S500.

In some examples, after S342, the subroutine B can return S350 to S250 in FIG. 5.

Figure 7A:
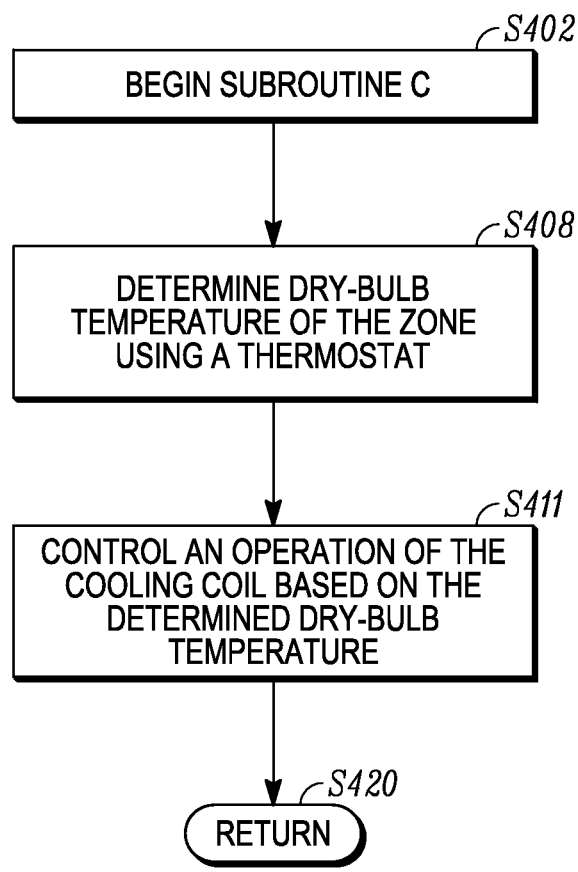
FIGS. 7A and 7B are flowcharts of the processes involved when a user selects the quiet mode, according to one embodiment.
Figure 7B:
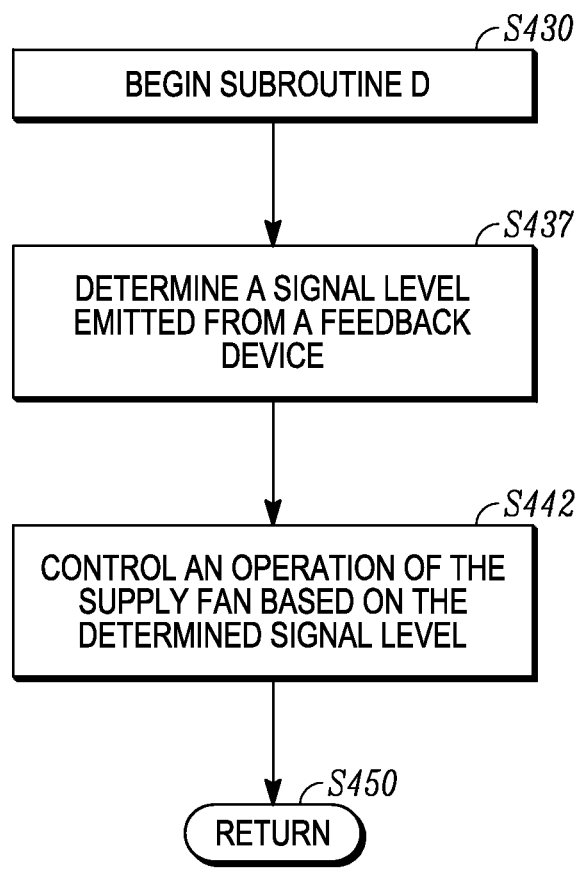

With reference to FIGS. 7A and 7B, if the quiet mode S400 is selected, then subroutine C begins at S402 and/or subroutine D begins at S430.

Referring to FIG. 7A, subroutine C can include determining a dry-bulb temperature of the zone 104 (S408), and then controlling the operation of the cooling coil 131 based on the determined dry-bulb temperature (S411). The term "controlling the operation of the cooling coil 131" means increasing, decreasing or maintaining the amount of heat transfer capacity of the cooling coil 126. In some examples, the operation of the cooling coil 126 can be controlled in any suitable manner known in the art. For instance, the cooling coil 126 can be controlled by turning the condenser on or off based on the determined dry-bulb temperature.

In some instances, the operation of the cooling coil 126 is controlled based on the determined dry-bulb temperature for a predetermined amount of time. In some other instances, the operation of the cooling coil 126 is controlled based on the dry-bulb temperature until a user selects a different operational mode, such as the normal mode S300 or the exit mode S500.

In some examples, after S411, the subroutine C can return S420 to S250 in FIG. 5.

Referring to FIG. 7B, subroutine D can include determining a level of a signal emitted from the feedback device 162 (S437), and then controlling the operation of the supply fan 131 based on the determined level of the signal (S442). The term "controlling the operation of the supply fan 131" means manipulating the speed of the fan so as to increase, decrease or maintain the quantity of supply air that is delivered to the zone 104. In some examples, the operation of the supply fan 131 can be controlled in any suitable manner known in the art. For instance, where the supply fan 131 is a variable speed fan, the supply fan 131 can be controlled by increasing, decreasing or maintaining a speed of the fan based on the determined level of the signal. In the instance where the supply fan 131 runs at a fixed speed, the supply fan 131 can be controlled by turning the fan on or off based on the determined dry-bulb temperature of the zone 104.

In some implementations, the speed of the supply fan 131 can be decreased if the determined signal level is higher than a predetermined level, and can be increased if the determined signal level is lower than the predetermined level. If the signal level is at the predetermined level, the speed of the supply fan 131 can be maintained.

In some examples, the operation of the supply fan 131 is controlled based on the determined level of the signal for a predetermined amount of time. In some other instances, the operation of the supply fan 131 is controlled based on the determined level of the signal until a user selects a different operational mode, such as the normal mode S300 or the exit mode S500.

In some examples, after S442, the subroutine B can return S450 to S250 in FIG. 5.

Referring to FIG. 5, if a user selects the exit mode S500, then the algorithm ends S275.

The system and method described herein can lead to relative noise reduction during operation. In one example, the system and method described herein can lead to about 10 dB noise reduction in the quiet mode as compared to that in the normal mode.

In some embodiments, a method includes operating a single-zone variable air volume (VAV) system. The operating includes monitoring a sound level of a supply air fan for the single-zone VAV system using a microphone; controlling a speed of the supply air fan based on the sound level, thereby controlling a sound level from the supply air fan; and modulating a cooling capacity of a cooling coil using a thermostat associated with a controlled space of the single-zone VAV system, thereby controlling a temperature of supply air entering the controlled space.

Aspects

Any of aspects 1-25 can be combined with one another.

Aspect 1. A method, comprising
controlling an operation of equipment in a heating, ventilating, and air conditioning (HVAC) system so as to obtain a desired range of a sound pressure level and/or a sound power level.

Aspect 2. The method of aspect 1, wherein the operation of the equipment is controlled using feedback.

Aspect 3. The method of aspect 2, wherein the feedback is obtained from a user.

Aspect 4. The method of aspect 3, further comprising controlling the operation of the HVAC system based on the feedback obtained from the user.

Aspect 5. The method of aspect 2, wherein the feedback is obtained using a device.

Aspect 6. The method of aspect 5, further comprising controlling the operation of the HVAC system based on the feedback obtained using the device.

Aspect 7. The method of aspect 5, wherein the device is capable of emitting, detecting, and/or measuring a signal.

Aspect 8. The method of aspect 5, further comprising measuring a signal using the device, and controlling the operation of the HVAC system based on the measured signal.

Aspect 9. The method of aspect 5, wherein the device is at least one selected from the group consisting of but not limited to: a microphone, a thermometer, an accelerometer, a motion sensor, and an amplifier.

Aspect 10. The method of aspect 1, wherein the equipment that is controlled is at least one selected from the group consisting of but not limited to: a fan, a damper, and a cooling coil.

Aspect 11. The method of aspect 1, wherein the equipment is controlled based on a schedule.

Aspect 12. The method of aspect 11, wherein the schedule is determined by a sound pressure map and/or a sound power map.

Aspect 13. The method of aspect 11, wherein the schedule is based on feedback obtained from a user or feedback obtained using a device.

Aspect 14. The method of aspect 1, wherein the operation of the equipment is controlled so as to obtain a predetermined space condition in addition to obtaining a desired range of a sound pressure level and/or a sound power level.

Aspect 15. The method of aspect 1, wherein the operation of the equipment is controlled based on priority of one or more conditions.

Aspect 16. The method of aspect 15, wherein the one or more conditions include sound and efficiency.

Aspect 17. The method of aspect 1, wherein the operation of the equipment is controlled based on a signal to noise ratio.

Aspect 18. The method of aspect 17, wherein the operation of the equipment is controlled using feedback, and the signal to noise ratio can be adjusted based on the feedback.

Aspect 19. The method of aspect 18, wherein the feedback is obtained from a user or obtained using a device.

Aspect 20. A heating, ventilating, and air conditioning (HVAC) system, comprising:
a controller that is configured to operate equipment in the HVAC system so as to obtain a desired range of a sound pressure level and/or a sound power level.

Aspect 21. The system of aspect 20, wherein the controller is configured to operate the equipment using feedback.

Aspect 22. The system of aspect 21, wherein the system further comprises a device and the feedback is obtained using the device.

Aspect 23. The system of aspect 22, wherein the device is capable of emitting, detecting, and/or measuring a signal.

Aspect 24. The system of aspect 22, wherein the device is at least one selected from the group consisting of a microphone, a thermometer, an accelerometer, and an amplifier.

Aspect 25. The system of aspect 20, wherein the controller is configured to control an operating state of at least one selected from the group consisting of a supply fan, a damper and a cooling coil to achieve the predetermined level of sound and/or vibration.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. The word "embodiment" as used within this specification may, but does not necessarily, refer to the same embodiment. This specification and the embodiments described are exemplary only. Other and further embodiments may be devised without departing from the basic scope thereof, with the true scope and spirit of the disclosure being indicated by the claims that follow.

What is claimed is:

1. A method, comprising
receiving feedback using a device, wherein the device includes one or more of a microphone, a thermometer, an accelerometer, a motion sensor, and an amplifier, the device being disposed in a ductwork providing conditioned air to a zone of a building conditioned by a heating, ventilation, and air conditioning (HVAC) system, the ductwork being in fluid communication with the zone, but physically outside of the zone; and
obtaining one or more of a range of a sound pressure level and a range of a sound power level in the zone by controlling an operation of equipment in the HVAC system based on the feedback received from the device, the controlling the operation of equipment in the HVAC system is based on an occupancy schedule,
in an occupied state, the controlling the operation of equipment in the HVAC system prioritizes maintaining one or more of the sound pressure level and the sound power level in the zone within the range of the sound pressure level and the range of the sound power level over maintaining a space condition, and
in an unoccupied state, the controlling the operation of equipment in the HVAC system prioritizes maintaining the space condition over maintaining the one or more of the sound pressure level and the sound power level in the zone within the range of the sound pressure level and the range of the sound power level.

2. The method of claim 1, further comprising receiving feedback from a user, the method further including controlling the operation of the HVAC system based on the feedback obtained from the user.

3. The method of claim 1, wherein the device is capable of emitting, detecting, and/or measuring a signal.

4. The method of claim 1, further comprising measuring a signal using the device, and controlling the operation of the HVAC system based on the measured signal.

5. The method of claim 1, wherein the equipment that is controlled includes one or more of a fan, a damper, and a cooling coil.

6. The method of claim 1, wherein the occupancy schedule is based on feedback obtained from a user or feedback obtained using a controller.

7. The method of claim 1, wherein the operation of the equipment is controlled based on a signal to noise ratio.

8. The method of claim 7, wherein the signal to noise ratio can be adjusted based on the feedback.

9. The method of claim 1, further comprising obtaining a selected energy efficiency by controlling the operation of equipment in the HVAC system, wherein the HVAC system is configured to selectively execute the obtaining a selected energy efficiency by controlling the operation of equipment in the HVAC system or the obtaining one or more of a range of a sound pressure level and a range of a sound power level in the zone by controlling an operation of equipment in the HVAC system based on the feedback received from the device.

10. A heating, ventilating, and air conditioning (HVAC) system, comprising:
a device disposed in a ductwork providing conditioned air to a zone of a building conditioned by the HVAC system, the device including one or more of a microphone, a thermometer, an accelerometer, a motion sensor, and an amplifier, the ductwork being in fluid communication with the zone, but physically outside of the zone; and
a controller that:
receives feedback from the device;
obtains one or more of a range a sound pressure level and a range of a sound power level by operating equipment in the HVAC system;
controls an operating state of at least one of a supply fan, a return fan, an exhaust fan, a damper, and a cooling coil to achieve the desired range of sound pressure level and/or the sound power level when in an occupied state, wherein the controller prioritizes maintaining the desired range of sound pressure level and/or the sound power level over maintaining a space condition, and
in an unoccupied state, controls the operating state of at least one of the supply fan, the return fan, the exhaust fan, the damper, and the cooling coil to achieve the space condition, wherein the controller prioritizes maintaining the space condition over maintaining the desired range of sound pressure level and/or the sound power level.

11. The system of claim 10, wherein the device is capable of emitting, detecting, and/or measuring a signal.

12. A method, comprising:
operating a single-zone variable air volume (VAV) system of a building, the operating including:
monitoring a sound level of a supply air fan for the single-zone VAV system using a microphone disposed in a ductwork providing conditioned air to a controlled space of the single-zone VAV system, the ductwork being in fluid communication with the controlled space, but physically outside of the controlled space;
in an occupied state,
controlling a sound level from the supply air fan by controlling a speed of the supply air fan, the supply air fan being disposed within the ductwork; and
modulating a cooling capacity of a cooling coil using a thermostat associated with the controlled space of the single-zone VAV system, thereby controlling a temperature of supply air entering the controlled space, wherein maintaining the sound level is prioritized over controlling the temperature of the supply air entering the controlled space; and
in an unoccupied state,
modulating the cooling capacity of the cooling coil using the thermostat associated with the controlled space of the single-zone VAV system, thereby controlling the temperature of supply air entering the controlled space, wherein controlling the temperature of the supply air entering the controlled space is prioritized over maintaining the sound level.

13. The method of claim 1, wherein obtaining one or more of a range of a sound pressure level and a range of a sound power level in the zone by controlling an operation of equipment in the HVAC system based on the feedback received from the device includes controlling a damper to bypass air into a silencer to reduce the one or more of the range of sound pressure level and the range of the sound power level.

* * * * *